March 8, 1932.    C. CONE    1,848,107
METHOD AND APPARATUS FOR FORMING AND ANNEALING SHEET GLASS
Filed Sept. 18, 1929    2 Sheets-Sheet 1
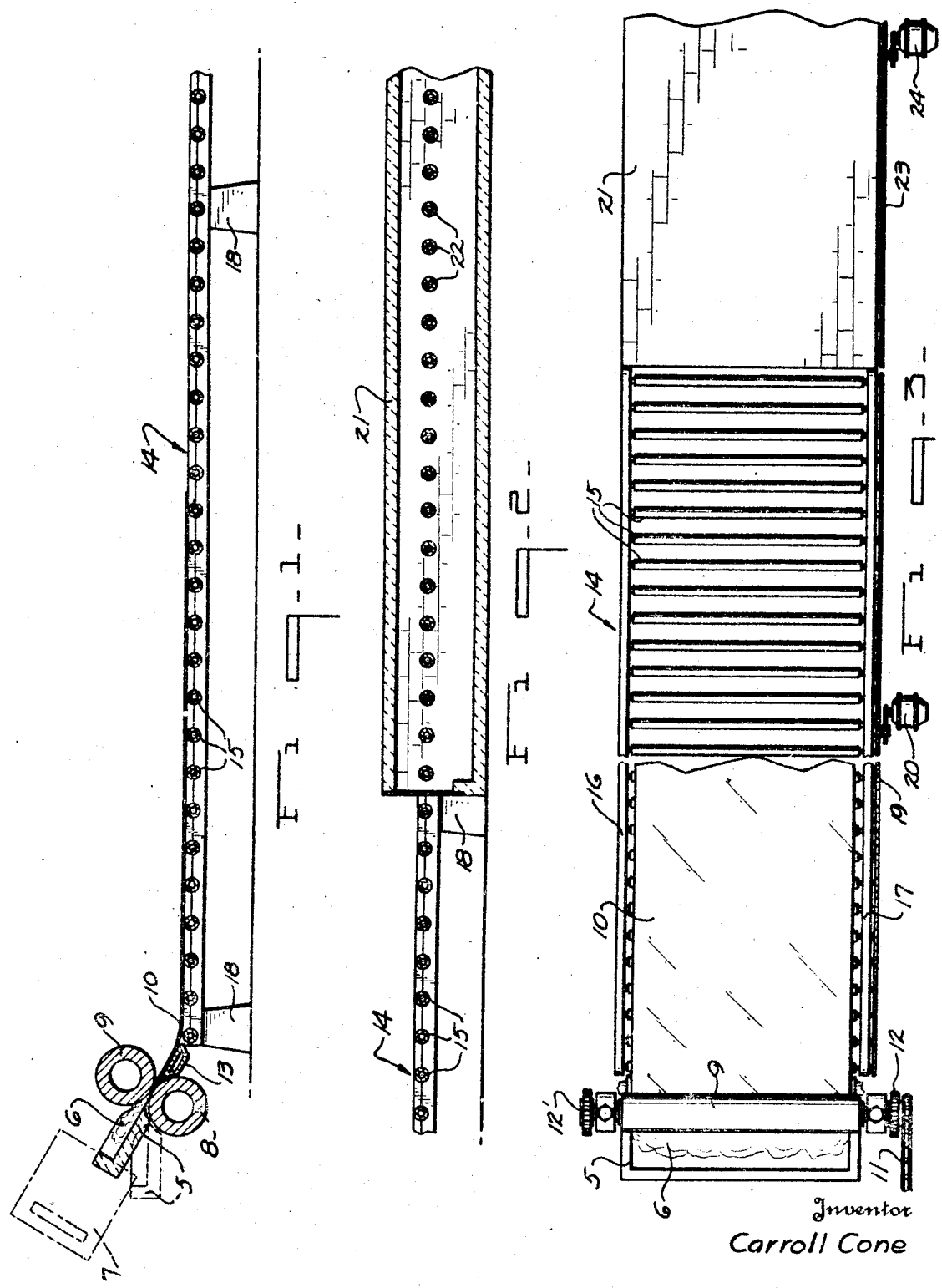
Inventor
Carroll Cone
By Frank Fraser
Attorney March 8, 1932.   C. CONE   1,848,107
METHOD AND APPARATUS FOR FORMING AND ANNEALING SHEET GLASS
Filed Sept. 18, 1929   2 Sheets-Sheet 2
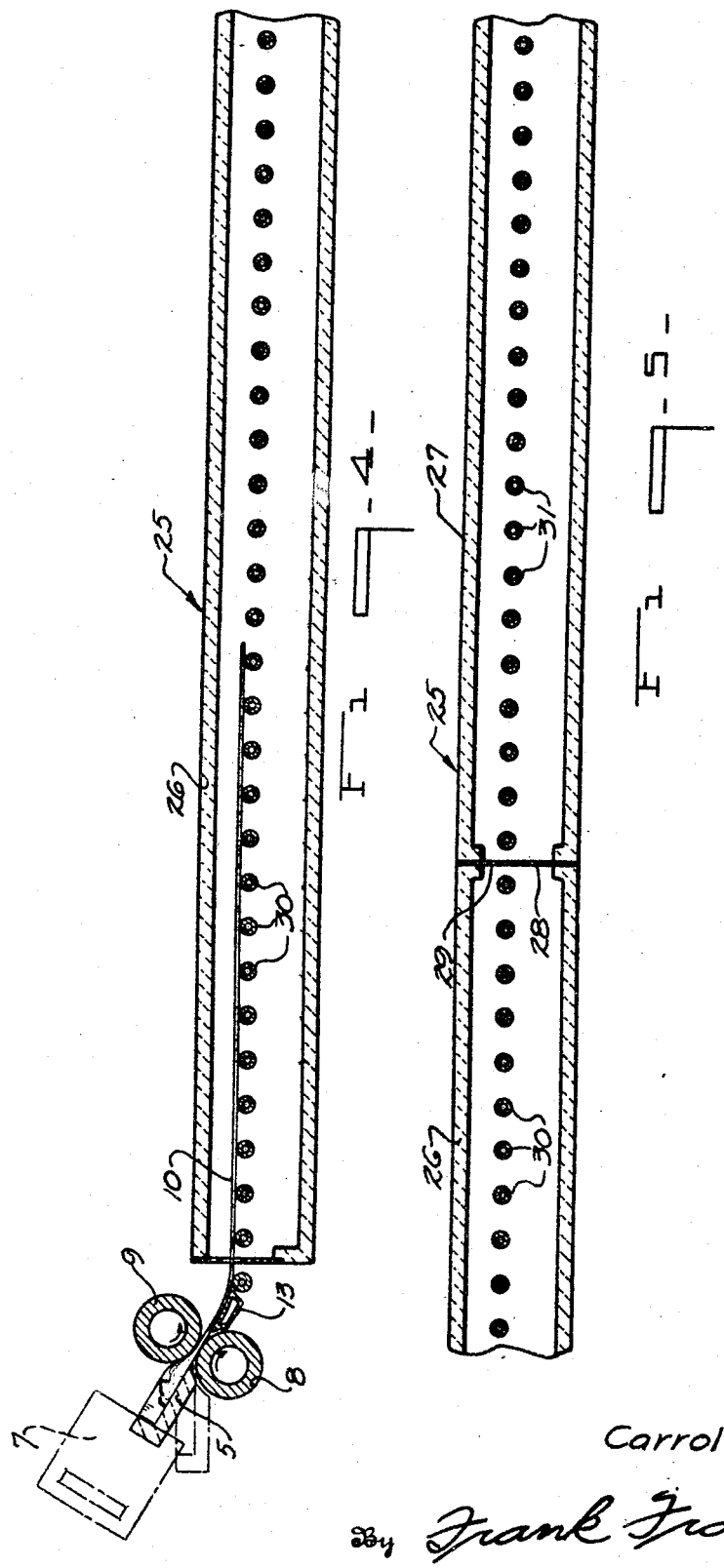
Inventor
Carroll Cone
By Frank Fraser
Attorney Patented Mar. 8, 1932

1,848,107

UNITED STATES PATENT OFFICE

CARROLL CONE, OF TOLEDO, OHIO, ASSIGNOR TO LIBBEY-OWENS-FORD GLASS COMPANY, OF TOLEDO, OHIO, A CORPORATION OF OHIO

METHOD AND APPARATUS FOR FORMING AND ANNEALING SHEET GLASS

Application filed September 18, 1929. Serial No. 393,555.

This invention relates broadly to the manufacture of sheet glass and more particularly to a method and apparatus for forming sheet glass by an intermittent rolling operation.

In the manufacture of sheet glass according to one method, a plurality of successive sheets of glass are intermittently rolled at predetermined intervals from a series of charges or pours of molten glass. The molten glass is preferably melted and refined within a suitable receptacle or pot and poured therefrom onto a receiver from where it is moved to and passed between a pair of forming rolls and reduced thereby to a sheet of substantially predetermined and uniform thickness. In the method just described, it is desirable that the molten glass passing to the forming rolls be rapidly reduced to sheet form. This is advisable for the reason that the glass will not become unduly chilled before it is formed into a sheet and further, the contact of the glass with the relatively cool forming rolls will be relatively short so that the surfaces of the glass sheet will not be unduly marred. Also, by rolling the glass at a relatively high rate of speed, production can be accelerated. While it is expedient to reduce the glass rapidly to sheet form, it is not necessary that the glass be annealed while traveling at this same high rate of speed and in fact, such is undesirable for the reason that in this event, the length of annealing leer necessary would have to be exceedingly long.

In its broad aspect, the present invention contemplates the provision of an improved method and apparatus whereby a mass of molten glass may be rapidly reduced to sheet form and the sheet subsequently annealed while traveling at a relatively slower speed. Thus, the invention aims to provide a method and apparatus which will embody those advantages incident to the rapid reduction of the molten glass to sheet form and likewise those advantages which result from slower annealing of the glass.

Another object of the invention is the provision of such a method and apparatus wherein a plurality of successive sheets of glass are adapted to be formed at predetermined intervals and at a relatively high rate of speed, each sheet being carried forwardly as it is formed into an annealing leer at its speed of formation, the speed of travel of the sheet through the leer being materially reduced during that interim between the formation of successive sheets while the speed of travel of the sheets is temporarily increased during the formation of each succeeding sheet. In this manner, the speed at which the sheet is passed through the leer will be intermittently varied and during the greater portion of the time required for annealing, the sheet will travel through the leer at a speed relatively less than its speed of formation.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through the forward end portion of apparatus constructed in accordance with the present invention, Fig. 2 is a similar view of the rear end portion, Fig. 3 is a plan view thereof, and Figs. 4 and 5 are vertical longitudinal sections of an alternative arrangement.

Referring to the drawings, 5 designates a receiver or support adapted to receive thereupon a mass of molten glass 6. This mass of molten glass is preferably supplied to the receiver 5 when the same is in a substantially horizontal position as indicated by the broken lines in Fig. 1, from a receptacle or pot 7 also indicated in broken lines. Ordinarily, the receiver 5 is of such a size as to support thereupon at one time, the entire contents of pot 7.

Associated with one end of the receiver 5 are the forming rolls 8 and 9 arranged to create a sheet forming pass therebetween through which the molten glass 6 is moved and reduced to a sheet 10 of substantially predetermined and uniform thickness. The receiver 5 and upper forming roll 9 are preferably mounted so that they are movable as a unit about the axis of rotation of the lower forming roll 8 so that after the glass 6 is disposed upon the receiver while in a horizontal position, the said receiver may be tilted to the position indicated by the full lines to advance the glass downwardly between the forming rolls.

As above brought out, it is desirable that the sheet of glass 10 be formed at a relatively high rate of speed and the forming rolls 8 and 9 are consequently rotated in a manner that their peripheral speed will be such that they will function to rapidly reduce the mass of molten glass to sheet form. One of the forming rolls may be positively driven such as through a chain drive 11 and the other roll may be driven from the first roll through intermeshing gears 12 carried by the roll shafts 12'.

An inclined runway 13 may be positioned as indicated to receive the sheet 10 issuing from the sheet forming pass and to guide and deposit the same upon the horizontally disposed conveying table 14. The conveying table 14 is preferably composed of a plurality of horizontally aligned rolls 15 carried upon shafts which are journaled at their opposite ends in side frames 16 and 17 mounted upon a plurality of supports 18. All of the rolls 15 of conveying table 14 are adapted to be driven at a constant uniform speed and this may be accomplished by the provision of a chain drive 19 associated with the roll shafts and driven from a motor 20 through suitable reduction gearing.

The sheet 10 is adapted to pass from the conveying table 14 into and through annealing leer 21, said sheet being supported and carried through the leer upon a plurality of horizontally arranged rolls 22 which are in alignment with the rolls 15 of the conveying table. The leer rolls 22 are adapted to be driven at a uniform speed independently of the rolls of the conveying table and this can be likewise accomplished by associating with the roll shafts a chain drive 23 driven from a variable speed motor 24.

In carrying the invention into practice, the forming rolls 8 and 9 and the receiving rolls 15 of conveying table 14 are adapted to be driven in unison at the same speed at all times, whereas the leer rolls 21 are adapted to be driven intermittently at different but corresponding speeds. Thus, during the reduction of the molten glass 6 to sheet form, the forming rolls 8 and 9 will be driven at a relatively high rate of speed and the rolls 15 of conveying table 14 will be driven simultaneously at the same speed so that as the sheet is formed and deposited upon the rolls 15, it will be carried forwardly at a speed equal to the speed of formation thereof. The sheet is carried forwardly at this speed until the forward end of the sheet reaches the intake end of the annealing leer, whereupon the speed of the leer rolls 22 is synchronized with the rolls 15 or, in other words, the said leer rolls are driven at a speed equal to the speed of formation of the sheet. The leer rolls are driven at this speed until the entire sheet is received within the annealing leer after which the speed of the leer rolls is materially reduced to carry the sheet forwardly through the leer at a relatively slower rate of speed. This reduced speed is maintained until the next sheet formed approaches the intake end of the leer whereupon the speed of the leer rolls is again increased or speeded up to receive the sheet from the conveying table 14. From the above, it will be seen that the speed of the leer rolls is synchronized with the speed of the rolls 15 during the transfer of the sheet from the conveying table into the leer but at other times travel at a relatively slower speed. The sheets are therefore caused to travel through the leer intermittently first at a relatively high rate of speed and then at a relatively slower rate of speed.

To explain more fully and by way of example only, let us assume that each sheet of glass is rolled or formed at the rate of sixty feet per minute. Therefore, during the formation of the sheet, the forming rolls 8 and 9 and conveyor rolls 15 are all operated so that their surfaces will move at the rate of sixty feet per minute. During the rolling of the sheet, the leer rolls are driven at a speed of approximately two feet per minute and this is continued until the sheet being formed reaches the intake end of the annealing leer whereupon the speed of the leer rolls is also increased to sixty feet per minute to receive the sheet from the transfer rolls 15 after which the speed of the leer rolls is again cut down. Thus, the sheet is formed at a relatively high rate of speed and subsequently annealed while traveling first at a relatively slower speed and then at a relatively high speed.

It will be apparent that in the event the sheet were formed at the rate of sixty feet per minute and it took sixty minutes to anneal the glass and the sheet was passed through the leer at a speed equal to the speed of formation thereof, the length of leer would have to be 3600 feet. The disadvantages incident to the construction, operation and maintenance of a leer of this length are believed to be obvious. According to the present invention, however, the length of leer necessary to properly anneal the glass may be materially decreased and brought to within a more practical and desirable length. For instance, assuming that with the apparatus disclosed, one sheet of glass is adapted to be rolled or formed every six minutes and that the length of the transfer table 14 is 300 feet.

The sheet, which will be assumed to have a length of sixty feet, is formed at the rate of sixty feet per minute and during this minute, the forming rolls and transfer rolls will be traveling at this high rate of speed. The sheet is carried forwardly at the same speed until its forward end reaches the intake end of the leer so that the forward travel of the sheet upon a conveying table 300 feet in length will require five minutes. In other words, it will take five minutes for the forward end of the sheet to reach the intake end of the leer. When the forward end of the sheet reaches the intake end of the leer, the leer rolls 22 are speeded up to sixty feet per minute to receive the sheet from the rolls 15 and the transfer of the sheet from the transfer rolls into the leer will consume one minute. After the sheet has been entirely received within the leer, its speed of travel is cut down to approximately two feet per minute and this speed is continued for five minutes or until the forward end of the next sheet formed reaches the forward end of the leer. In order to receive the next sheet, the leer rolls 22 are again speeded up to synchronize with the rolls 15. Thus, within the six minute cycle, the sheet travels through the leer at the rate of 70 feet in six minutes with an average annealing speed of 11⅔ feet per minute. Therefore, if sixty minutes be required to anneal the glass, and the glass travels through the leer at an average speed of 11⅔ feet per minute, the leer would be approximately 700 feet long which is not an impractical or undesirable length. The gaps between successive sheets will be ten feet and this gap can be increased or decreased by varying the minimum speed. In this manner, the sheet is kept constantly in motion at all times to prevent sagging thereof and a continuous annealing operation is had. While, after the sheet is formed and passed through the leer, it is at intervals caused to travel at a speed equal to the speed of formation, yet the sheet is annealed while traveling at an average speed much slower than the speed of formation of the sheet so that it may be accurately stated that the sheet is formed at a relatively high speed and subsequently annealed while traveling at a relatively slower speed. The rolls 15 of conveying table 14 may be said to constitute the receiving section and the leer rolls 22 the annealing section of the conveying means for receiving the sheet from the forming means and carrying it into and through the annealing leer.

The apparatus illustrated in Figs. 4 and 5 is substantially the same as that described hereinabove with the principal exception that the conveying table 14 located outside the leer is omitted and the sheet is caused to travel directly into the leer as it leaves the runway or chute 13. As here shown, there is provided an annealing leer designated in its entirety by the numeral 25, said leer being of tunnel-like formation and the interior thereof being divided into a receiving section 26 and an annealing section 27 separated by a partition wall 28 having a transverse slot 29 therein through which the sheet may pass from the one section into the other. Arranged within the receiving section 26 of leer 25 are a plurality of horizontally arranged sheet supporting rolls 30 and a plurality of similar sheet supporting rolls 31 are arranged within the annealing section and disposed in horizontal alignment with the receiving rolls 30. The rolls 30 are adapted to take the place of and be operated in the same manner as the rolls 15 of the conveying table 14 above described. In other words, the receiving section 26 of the leer is adapted to be of substantially the same length as the conveying table 14, and the rolls 30 thereof are driven at a constant uniform speed substantially equal to the speed of formation of the sheet, while the rolls 31 of the annealing section are adapted to be driven at a speed equal to the speed of the rolls 30 during the transfer of the sheet from the receiving section 26 into the annealing section 27 and to then travel at a relatively slower annealing speed until the next sheet formed approaches the partition wall 28, thereupon the speed of the leer rolls is again increased or speeded up to receive the sheet from the rolls 30.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for forming and annealing sheet glass, means for reducing a mass of molten glass to sheet form, an annealing leer, and conveying means for receiving the sheet from the forming means and carrying it into and through said leer including a constant speed receiving section and a variable speed annealing section.

2. In apparatus for forming and annealing sheet glass, means for reducing a mass of molten glass to sheet form at a relatively high rate of speed, an annealing leer, and means for receiving the sheet from the forming means and carrying it into and through said leer including a receiving section adapted to travel at a constant speed substantially equal to the speed of formation of the sheet, and an annealing section adapted to travel at a speed substantially equal to the speed of the receiving section and also at a relatively slower speed.

3. In apparatus for forming and annealing sheet glass, means for reducing a mass of molten glass to sheet form, a constant speed receiving section positioned in line with the forming means for receiving the sheet therefrom, an annealing leer in line with the receiving section, and a variable speed conveying mechanism located within the leer for receiving the sheet from the receiving table and carrying it through said leer.

4. The method of producing sheet glass, which consists in first forming the sheet at a relatively high rate of speed, carrying the sheet forwardly into an annealing chamber at a speed equal to the speed of formation thereof, annealing the sheet, and in intermittently decreasing and then increasing the speed of travel of the sheet at predetermined intervals during the annealing thereof.

5. The method of producing sheet glass, which consists in forming a plurality of successive sheets of glass at predetermined fixed intervals, carrying each sheet forwardly into an annealing chamber at a speed equal to the speed of formation thereof, and in reducing the speed of travel of the sheet through the annealing chamber during the interim between the formation of successive sheets.

6. The method of producing sheet glass, which consists in forming a plurality of successive sheets of glass at predetermined fixed intervals and at a relatively high rate of speed, carrying each sheet forwardly into an annealing chamber at a speed equal to the speed of formation thereof, reducing the speed of travel of the sheet through the annealing chamber during the interim between the formation of successive sheets, and in then again increasing the speed of travel of the sheet during the formation of each succeeding sheet.

7. The method of producing sheet glass, which consists in forming a plurality of successive sheets of glass at predetermined intervals and at a relatively high rate of speed, carrying each sheet forwardly as it is formed into an annealing chamber at a speed equal to its speed of formation, carrying the sheet through the chamber at a speed equal to the speed of formation of the sheets during the periods in which succeeding sheets are formed, and in reducing the speed of travel of the sheet through the chamber during the interim between the formation of successive sheets.

Signed at Toledo, in the county of Lucas and State of Ohio, this 30th day of August, 1929.

CARROLL CONE.